3,502,856
HERMETICALLY SEALED LIGHT FIXTURE
INSET IN A ROADWAY
William C. Daley, Suffield, Conn., assignor, by mesne assignments, to Structural Electric Products Corp., a corporation of Connecticut
Filed July 27, 1967, Ser. No. 656,455
Int. Cl. B64f 1/20; H01b 17/30
U.S. Cl. 240—1.2                                    4 Claims

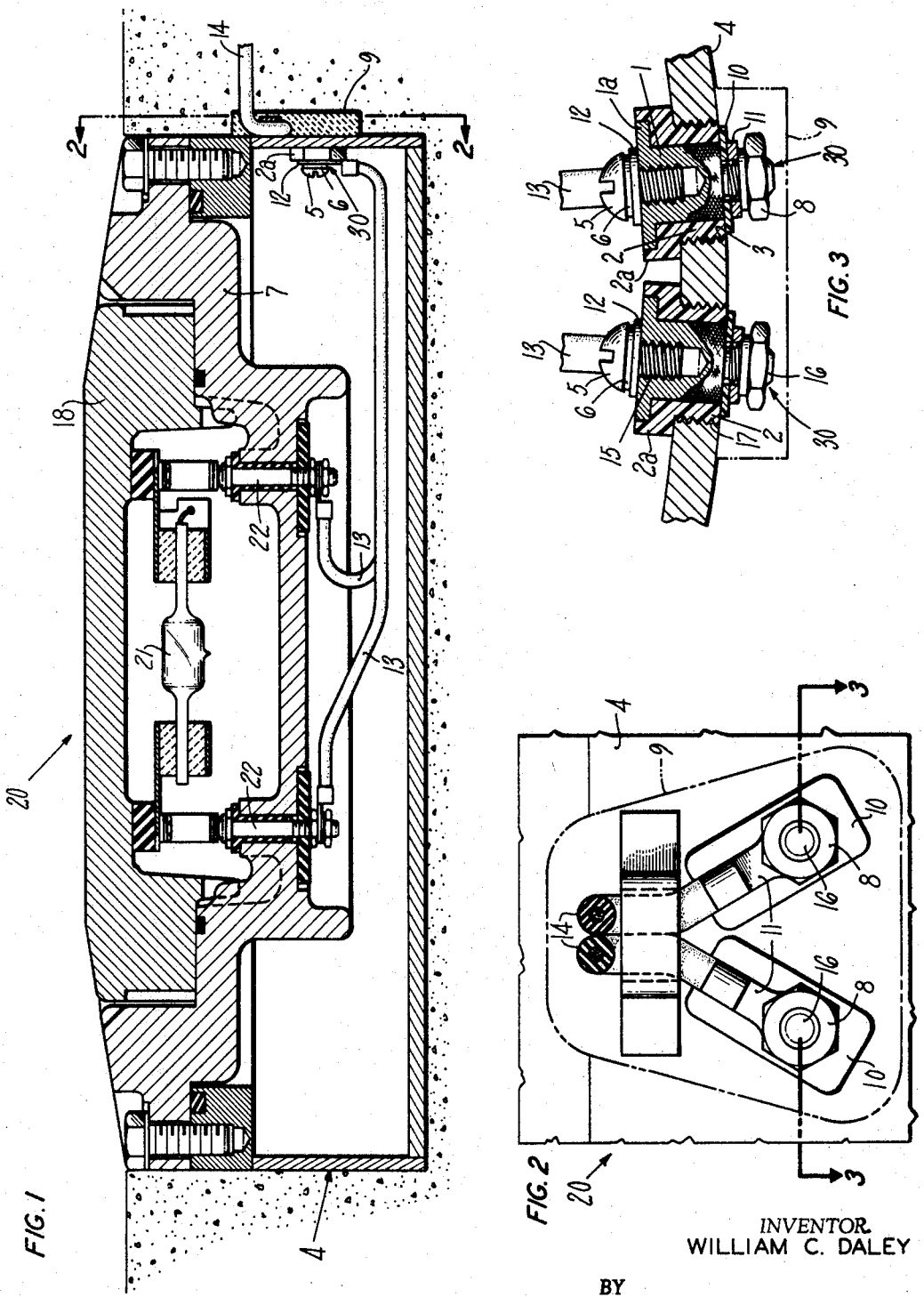

ABSTRACT OF THE DISCLOSURE

A hermetically sealed light fixture for recessed installation in a roadway, includes a casing and electrical lead-throughs therefor with each lead-through having a flanged or headed conductive core and an externally threaded sealing and insulating sheath molded over the core and flange. Each lead-through is threaded in a threaded aperture in the casing and compresses the sheath into sealing engagement with the casing. The core has inner and outer terminals to removably connect electrical leads thereto and the outer lead connection is potted-in-place to seal the same relative to the lead-through and to the casing.

---

This invention relates to hermetically sealed light fixtures inset in roadways and is particularly concerned with electrical lead-throughs for such fixtures having increased mechanical strength and shock resistance, improved electrical insulation and hermetic sealing characteristics, terminal means for removable lead connections, and improved reliability under intense heat stress operating conditions.

Airport runway marker lights are commonly partly recessed in the runway surface. Such lights generate intense heat during operation which must be dissipated through the casing, imposing severe requirements on the parts and materials utilized in the light fixture for withstanding extreme temperature variations. Accordingly, an object of this invention is to provide a new and improved hermetically sealed underground-type fixture and electrical lead-throughs therefor.

Another object of this invention is to provide a hermetically sealed underground-type fixture with potted-in-place detachable lead-throughs that eliminate leakage.

Another object of this invention is to provide a hermetically sealed underground-type fixture with electrical lead-throughs which meet or exceed severe performance standards of temperature extremes, hermetic sealing effectiveness under positive and negative pressure changes resulting from the temperature extremes and the mechanical stresses required for the inset application.

Another object of this invention is to provide a hermetically sealed underground-type fixture with electrical lead-throughs sealed to detachable supply leads which are also sealed with respect to the walls of the fixture-receiving structure adjacent the lead-throughs.

Other objects and advantages of this invention become apparent in the specification that follows.

The invention accordingly consists in the features of construction, combination of elements and arrangement of parts which will be exemplified in the construction hereafter set forth and the scope of the application which will be indicated in the appended claims.

In the drawings:

FIG. 1 is a reduced side section view of an underground installed light fixture and casing therefor, utilizing the invention;

FIG. 2 is an enlarged end view, partly broken away, taken along the line 2—2 of FIG. 1 and illustrating lead line connections; and FIG. 3 is an enlarged section view, partly broken away, taken along the line 3—3 of FIG. 2.

The pancake-type of light fixture shown generally by 20 is adapted for being partly embedded in the surface of airport runways, with its top protruding slightly above the surface. The complete fixture 20 utilizes casing 4 which is generally permanently embedded in the surface prior to lamp installation, intermediate base ring 7 which is hermetically sealed to, seated on and bolted to casing 4 as shown, and an optical unit 18 which is hermetically sealed to and seated on base ring 7 and is removably associated therewith in any suitable manner such as with bolts not shown. Appropriate conductors 13 are connected to the lamp 21 of the optical unit 18 through insulated conductors 22 of the base ring 7 with the conductors 13 in turn being removably connected to the terminals 5 of the lead-throughs 30.

In order to provide an electrical connection through the wall of casing 4 to connect supply lines 14 to conductors 13, a pair of composite lead-throughs 30 of high mechanical strength and shock resistance, and improved electrical insulation and reliability under the intense heat stress encountered in operation are provided. The composite lead-throughs 30 each have a shank-type knurled metal core 1 with a head 1a. An insulating sheath 2 of plastic having flange portion 2a with external threads 3 formed on the shank portion thereof is molded around the core 1. A suitable plastic is one having the desired characteristics of resiliency without taking a set or relaxing under stress, toughness and surface hardness, resistance to the absorption of moisture, high impact strength and dielectrical properties and resistance to the loss of these characteristics by reason of aging and in both high and low temperature environments. One such plastic which has been found to be suitable for this application is nylon. As the molded plastic sheath 2 cures over the core 1, it contracts and is placed in tension around the core somewhat like the tension of a hoop driven onto a barrel. This hoop tension and the knurling on the core impart great mechanical strength to oppose shearing forces between each lead-through 30 and core 1 which in effect renders each core 1 and sheath 2 thereof mechanically integral and hermetically sealed to each other.

As shown, each composite lead-through 30 is installed from the inner side of the casing, so that the head 1a of the core 1 and the head 2a of the sheath 2 overlie the periphery of the internally threaded aperture 17. Engagement of the threads 3 with the casing aperture threads provides hermetic sealing of the casing and lead-through 30 which may be enhanced by application of, for example, a rubber sealing compound to the threads 3. Furthermore, as the lead-through is screwed down against the casing, the aperture-overlying core head 1a compresses the resilient sheath head 2a also overlying the aperture into such intimate engagement with the casing as to positively preclude any moisture ever passing into the casing 4 from without, thus providing a double seal against leakage.

As shown, each core 1 is provided with a threaded aperture 15 to receive a removable, male-threaded screw-type terminal 5 which can include a lockwasher 6 to secure a lead eyelet 12 of the detachable conductor 13. The headed and insulating structure of each lead-through 30 electrically isolates the lead eyelet 12 from the casing 4.

Externally of the casing each core 1 is shown as being provided with an integral male-threaded shank portion 16 over which can be installed an insulator 10 to removably connect a lead eyelet 11 of a lead 14, said eyelet being secured on the threaded portion 16 by threaded electrical terminal nut 8. Each lead 14 is, preferably, thus joined closely proximate the casing 4 to enhance the mechanical security of the complete lead-through installation, and at the same time, is safely insulated from casing 4. As so far disclosed, the invention provides positive hermetic sealing, improved electrical insulation, and increased mechanical strength and shock resistance through use of the threaded flanged core 1 and sheath 2, and the shank-type terminal portion 16 integral with the core 1. Mechanical stresses on each lead-through 30 such as a pull, gradual or otherwise, upon the lead 14 are readily resisted by this construction which transfers such stresses to the casing through the head 1a of the core 1.

In order to hermetically seal the leads 14 to the lead-throughs 30 sealing compound 9 of the setting type such as epoxy, is potted-in-place around and upon each lead line connection after the terminal nuts 8 are tightened upon eyelets 11. This in-place potting not only provides unbroken electrical insulation between leads 14 and lead-throughs 30 but also with the adjacent portion of casing 4 intimately adhering to these elements and particularly when formed in a continuous pattern over the two connections for each fixture, as shown, providing additional resistance of the connections to mechanical stresses as well as combining hermetic sealing of the same while permitting the disconnection of the leads 14. Should it be necessary to disconnect the leads 14, the sealing compound 9 may be readily removed to bare the terminals 16 without destruction of the hermetic seal between the lead-throughs 30 and casing 4. If transparent potting compound is used, visual inspection of the external connections for circuit flaws such as short circuit-caused carbon paths is facilitated.

The invention thus provides a hermetically sealed light fixture adapted for recessed installation in a vehicular way, including a casing for the fixture and composite lead-throughs utilizing resilient headed and threaded sheaths molded over headed conductor cores in the casing with externally potted-in-place connections so the final installation exhibits the mechanical strength, resistance to shock, positive electrical insulating properties, ready lead detachability and reliability under the extreme heat stresses encountered in use.

As will be apparent to persons skilled in the art, various modifications and adaptations of the structure above-described will become readily apparent without departure from the spirit and scope of the invention, the scope of which is defined in the appended claims.

I claim:

1. A hermetically sealed light fixture for recessed installation in a roadway comprising, in combination, a casing having at least one internally threaded aperture, at least one composite lead-through having a headed shank-type knurled conducting core and an externally threaded reinforced flanged insulating sheath molded thereto adapted to sealably fill and overlie the periphery of the aperture with the core head overlying the flange of the sheath to compress the same between the core head and the periphery of the aperture, inner and outer terminal means associated with the core to removably connect electrical conductors thereto, and molded-in-place potting compound continuously sealing the outer terminal and conductor means and the adjacent casing.

2. The structure defined in claim 1 in which the inner terminal means include a threaded terminal for the core, isolated from the casing, and in which the outer terminal means include a threaded terminal integral with the core, isolated from the casing.

3. The structure defined in claim 2 including sealing compound on the sheath threads to provide a double seal against leakage.

4. The structure defined in claim 3 in which the potting compound is transparent to provide for visual inspection for indications of circuit defects such as carbon paths.

References Cited
UNITED STATES PATENTS

| | | | |
|---|---|---|---|
| 2,579,973 | 12/1951 | Schlosser | 174—152 XR |
| 2,944,325 | 7/1960 | Clark | 174—152 XR |
| 3,214,506 | 10/1965 | Hugo | 174—84 |
| 3,322,890 | 5/1967 | Kennedy et al. | 174—152 |
| 3,349,233 | 10/1967 | Angier | 240—1.2 |

NORTON ANSHER, Primary Examiner

D. S. STALLARD, Assistant Examiner

U.S. Cl. X.R.

174—152